US 6,639,879 B2
United States Patent
Plutt et al.
Patent No.: US 6,639,879 B2
Date of Patent: Oct. 28, 2003

(54) LIBRARY PERFORMANCE SCALING WITH INCREMENTAL HEIGHT GRADIENT ROBOTICS

(75) Inventors: Daniel James Plutt, Superior, CO (US); Timothy C. Ostwald, Louisville, CO (US)

(73) Assignee: Storage Technology Corporation, Louisville, CO (US)

(*) Notice: Subject to any disclaimer, the term of this patent is extended or adjusted under 35 U.S.C. 154(b) by 0 days.

(21) Appl. No.: 10/033,849

(22) Filed: Dec. 19, 2001

(65) Prior Publication Data
US 2003/0112717 A1 Jun. 19, 2003

(51) Int. Cl.[7] ................................ G11B 17/22
(52) U.S. Cl. ............................... 369/30.45
(58) Field of Search ................... 369/30.45, 30.33, 369/30.39, 30.43, 30.49; 360/92; 414/331.11, 331.14

(56) References Cited

U.S. PATENT DOCUMENTS

| 4,937,690 | A |   | 6/1990  | Yamashita et al. |             |
|-----------|---|---|---------|------------------|-------------|
| 5,206,845 | A | * | 4/1993  | Baxter et al.    | 360/98.06   |
| 5,303,214 | A |   | 4/1994  | Kulakowski et al.|             |
| 5,546,366 | A |   | 8/1996  | Dang             |             |
| 5,970,030 | A |   | 10/1999 | Dimitri et al.   |             |
| 6,038,490 | A | * | 3/2000  | Dimitri et al.   | 360/98.04   |
| 6,222,699 | B1| * | 4/2001  | Luffel et al.    | 360/92      |

FOREIGN PATENT DOCUMENTS

EP          0 289 986        11/1988

OTHER PUBLICATIONS

"Moving Rack Automated Library for Removable Data Storage Media", IBM Technical Disclosure Bulletin, IBM Corp., New York, US, vol. 36, No. 9A, Sep. 1, 1993, pp. 119–120.

* cited by examiner

Primary Examiner—Carl Whitehead, Jr.
Assistant Examiner—Jennifer M Dolan
(74) Attorney, Agent, or Firm—Carstens, Yee & Cahoon, LLP

(57) ABSTRACT

A system for scaling robotic mechanisms in a storage library is provided. The invention comprises a plurality of storage cell rows and a plurality of robots coupled to guide rails, which allow the robots to move along the rows of storage cells. The robots have picker mechanisms that can manipulate items in the storage cells, and displacement mechanisms that allow the pickers to move between rows of storage cells. The displacement mechanisms on the robots are configurable to allow the picker mechanisms to access a specified number of storage cell rows. The displacement mechanisms of the robots can be reconfigured in order to change the number of storage cell rows covered by a single robot, and guide rails can be added and removed to accommodate different numbers and sizes of robots.

20 Claims, 5 Drawing Sheets

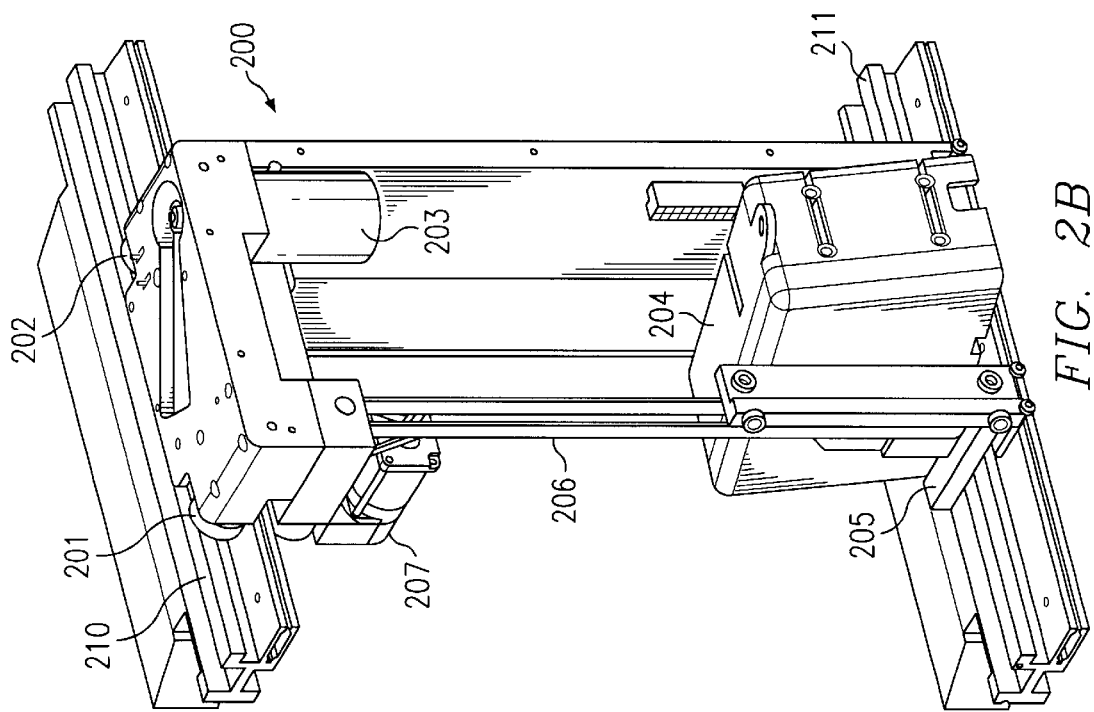
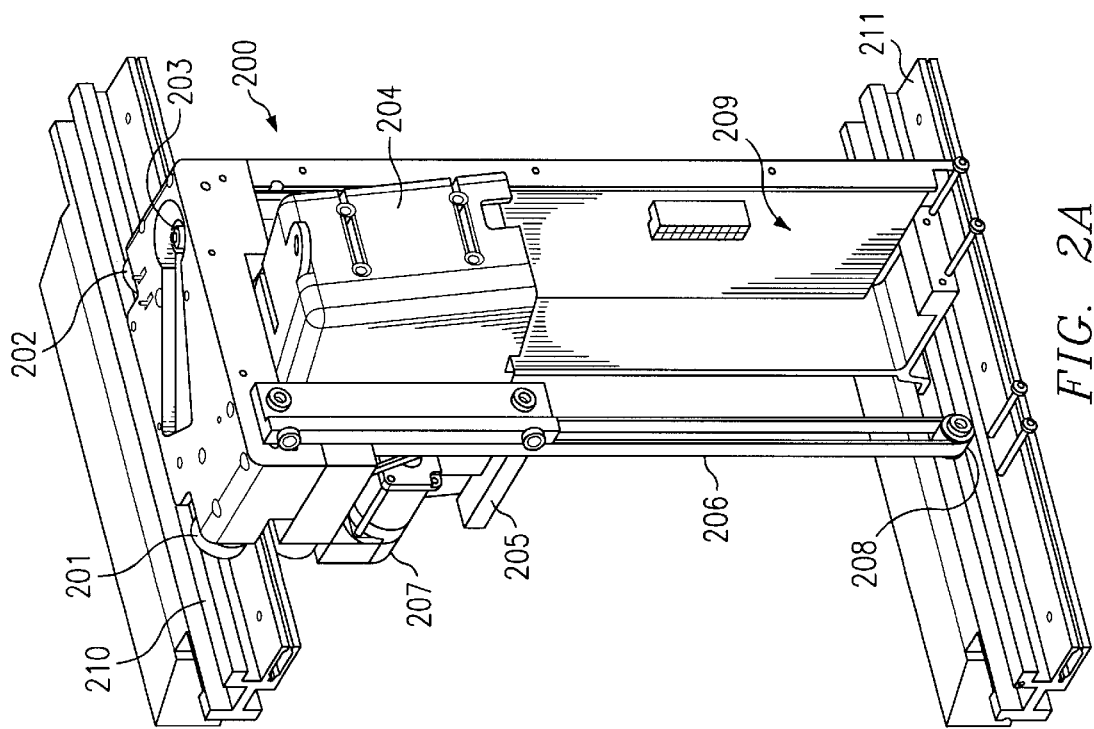

LIBRARY PERFORMANCE SCALING WITH INCREMENTAL HEIGHT GRADIENT ROBOTICS

BACKGROUND OF THE INVENTION

1. Field of the Invention

The present invention relates generally to robotic media storage library systems, and more specifically to a redundant system that includes a plurality of independent robots in the form of robotic pods.

2. Background of the Invention

The current enterprise class library system contains multiple independent robots for concurrently manipulating multiple media cartridges. The library system comprises an array of media storage cells and media cartridge players. A system of rails is used to guide robotic pods through al of the locations on the array.

A problem for storage library designers is how to scale a low cost, low performance machine up to a high cost, high performance machine, while retaining as much of the original design as possible. Library performance is a factor primarily of robotics speeds and movement distances. Therefore, typical performance upgrades are found in increasing robot speeds and shrinking the size of the library in order to shorten movement distances. Such upgrades can be costly and are limited in scope by other physical parameters.

Therefore, it would be desirable to have a method for upgrading library performance in a piecemeal manner, which would allow a customer to pay-as-he-goes to get the desired level of performance, without having to replace complete libraries or platforms.

SUMMARY OF THE INVENTION

The present invention provides a system for scaling robotic mechanisms in a storage library. The invention comprises a plurality of storage cell rows and a plurality of robots coupled to guide rails, which allow the robots to move along the rows of storage cells. The robots have picker mechanisms that can manipulate items in the storage cells, and displacement mechanisms that allow the pickers to move between rows of storage cells. The displacement mechanisms on the robots are configurable to allow the picker mechanisms to access a specified number of storage cell rows. The displacement mechanisms of the robots can be reconfigured in order to change the number of storage cell rows covered by a single robot, and guide rails can be added and removed to accommodate different numbers and sizes of robots.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIGS. 2A and 2B depicts pictorial diagrams illustrating an elevator robot mechanism in accordance with the present invention;

DETAILED DESCRIPTION OF THE PREFERRED EMBODIMENT

Figure 1:
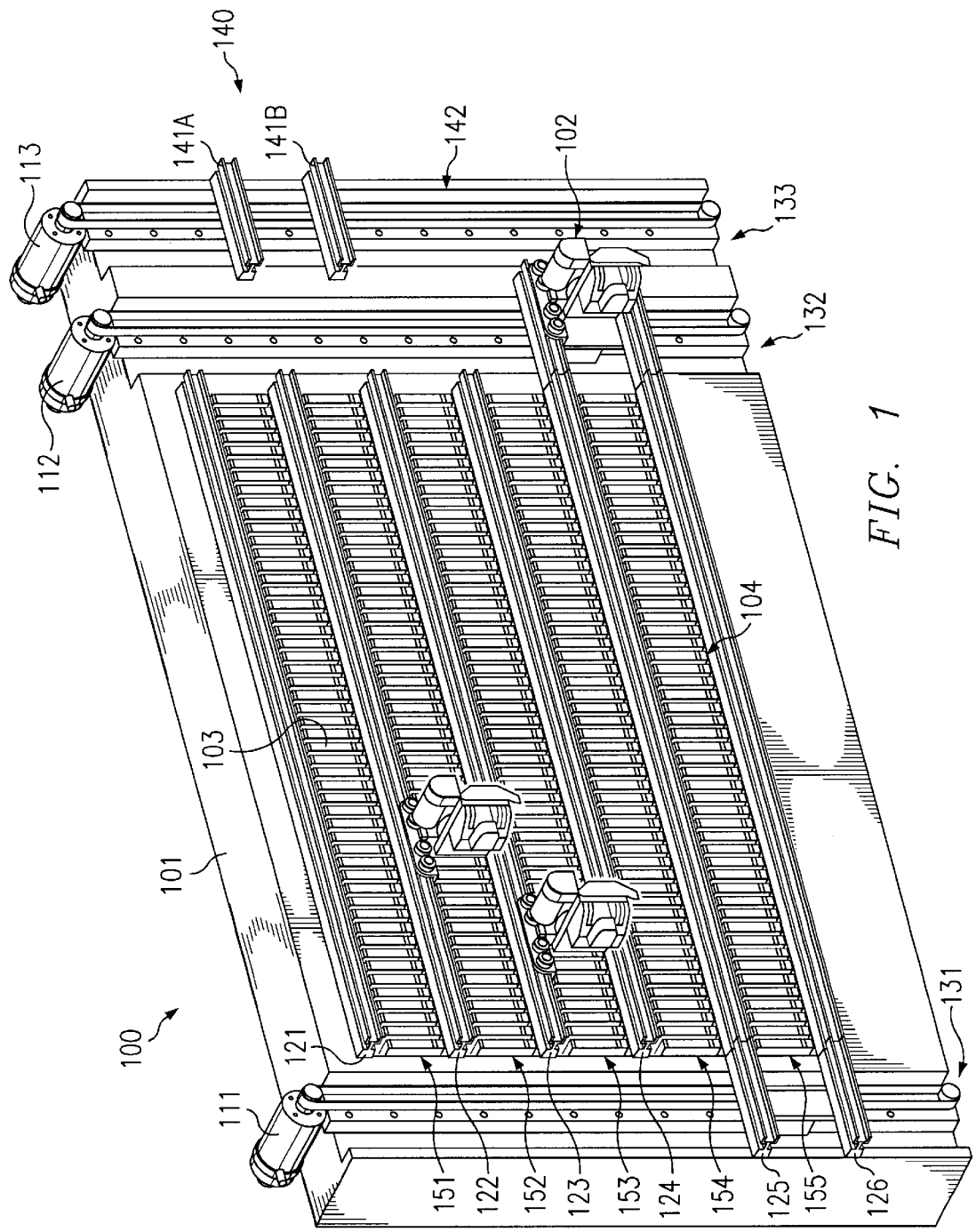
FIG. 1 depicts a perspective pictorial diagram illustrating the architecture of a single library storage module in accordance with the present invention.

The architecture of the present automated library system 100 is illustrated in FIG. 1 and contains the multiple independent robots 102 to enable the library system 100 to concurrently manipulate multiple media cartridges 105. The library system 100 comprises a two-dimensional array of media cartridge storage cells 103 and media cartridge players 104 that are mounted in a frame 101. A system of rails 121–126 is used to guide robotic pods 102 through all of the locations in the array, which eliminates the need for any steering or guide mechanisms on board the robotic pods 102, resulting in a reduction in the mass of the robotic pods 102. The rail system 121–126 also constrains the movement of the robotic pods 102 into horizontal and vertical movements, thereby simplifying the control algorithms for collision avoidance that are required by a typical random moveable object handling system based on horizontal, vertical and diagonal degrees of freedom. The robotic pods 102 contain a moveable carriage that is capable of transporting robotic components, such as media cartridge pickers, bar code reading devices, and other task oriented submodules, on the storage library rail system.

As shown in FIG. 1, the frame 101 is designed to receive a plurality of rows 151–154 of media cartridge storage cells 103, each of which is designed to house a single media cartridge 105. The media cartridge players 104 are shown in an arbitrary location in a horizontal row 155 at the bottom of the frame 101, although the library system 100 can incorporate media cartridge players 104 at any location in the frame 101 to optimize performance. The robotic pods 102 are attached to the frame 101 via horizontal guide rails 121–126, which serve to frame the media cartridge storage cells 103 and media cartridge players 104 on the top and bottom sides thereof. FIG. 1 shows an array of media storage cells 103 fully populated with media cartridges 105 of any arbitrary type. The robotic pod guide rails 121–126 provide support of the robotic pods 102 in the vertical direction to oppose the force of gravity, and they also provide a meshing surface of suitable design to impart traction in the horizontal direction for motive transport of the robotic pods 102. The robotic pods 102 each incorporate a drive means for propulsion in the horizontal direction along the guide rails 121.

FIG. 1 also shows a plurality of vertical elevator assemblies 131–133 that enable the transfer of the robotic pods 102 in the vertical direction. Multiple vertical elevator assemblies 131–133 are shown in FIG. 1 to exemplify the extensibility and redundancy of the invention. Each of the vertical elevator assemblies 131–133 comprise a set of vertical rails 142 that extend substantially from the top of the frame 101 to the bottom of the frame 101. The vertical rails 142 support a plurality of elevator stations 140, each of which contain short horizontal rail segments 141A, 141B that are identical in cross section to the main horizontal guide rails 121–126. The elevator stations 140 are held in suspension by a drive belt 143 which is made to wrap around a drive pulley attached to a vertical drive motor 113 that is located at the top of each elevator assembly 133. When a vertical displacement is required of any robotic pod 102, the vertical elevator 140 is scheduled to move in alignment to the appropriate level of rows 151–155 to allow transfer of the robotic pod 102 onto the elevator rail section 141A, 141B from the pair of horizontal rails 121–126 that are juxtaposed and abutting to the elevator rails 141A, 141B. Once the robotic pod 102 is located on the elevator station 140, the drive motor 113 is activated to transport the robotic pod 102 to a selected one of rows 151–155 and thence moves on to the pair of horizontal rails 121–126 that correspond to the selected row. Elevator assemblies 131–133 can carry more than one robotic pod 102 at a time by adding elevator platforms 140 to the elevator assemblies 131–133 or by extending the elevator platform length to accommodate multiple robotic pods 102 on a single elevator station 140.

Referring now to FIGS. 2A and 2B, pictorial diagrams illustrating an elevator robot mechanism are depicted in accordance with the present invention. The elevator robot 200 offers an alternative design to the robotic pod 102 depicted in FIG. 1. Whereas the robot pod 102 in FIG. 1 only operates on one row at a time (e.g., row 152) the elevator robot mechanism 200 allows a single picker to retrieve cartridges from storage cells on multiple rows at a time.

The robot 200 is supported by upper and lower rails 210 and 211. (In an alternate embodiment, a single rail may be used to support each robot.) The robot 200 is guided along rails 210 and 211 by wheels 201 and 202 and is driven by motor 203, which is illustrated clearly in FIG. 2B.

The picker unit 204 contains a gripper mechanism (not shown), which manipulates media cartridges. The picker unit 204 is move up and down (vertically translates) within the robot assembly 200 in order to reach media cartridges in multiple rows of storage cells. FIG. 2A depicts the picker unit 204 in the top position, while FIG. 2B depicts the picker unit 204 in the bottom position. The vertical movement of picker unit 204 is provided by a displacement mechanism 205, which is drawn up and down by drive belt 206. The drive belt, in turn, is driven by motor 207 using pulley 208.

Also depicted are the control electronics 209 for the robot 200. The control electronics allow for input/output (I/O) commands to and from the robot 200, which allows the library system to monitor and direct the robot to the necessary locations along a storage module, such as module 100 in FIG. 1.

The present invention uses a height gradient solution to take advantage of multiple-robot architecture to deploy the optimal number of robots, each of the correct capacity, to match user requirements. A rail-mounted picker carriage assembly, e.g., robot 200, can be adapted in the vertical direction to cover more storage cells within a library. Essentially, the length of the carriage of robot is increased to allow picker mechanism to travel over a greater vertical distance.

An incremental increase in the picker vertical coverage does slow performance because a single picker has to traverse of rows of cells. However, increased vertical scaling reduces the number of robots needed to service a given number of storage cell rows and guide rails may be eliminated, thus reducing overall cost.

A decrease in picker vertical coverage reduces the number of rows serviced by a single picker, improving performance. However, more pickers and guide rails are needed to service a given number of storage cell rows, increasing costs. A single-row picker, e.g., robot 102, would achieve the highest performance gradient. Vertical scalability of the storage library is based not only on size, but also on the capability to add and subtract robotic pickers as required by the user.

Figure 3:
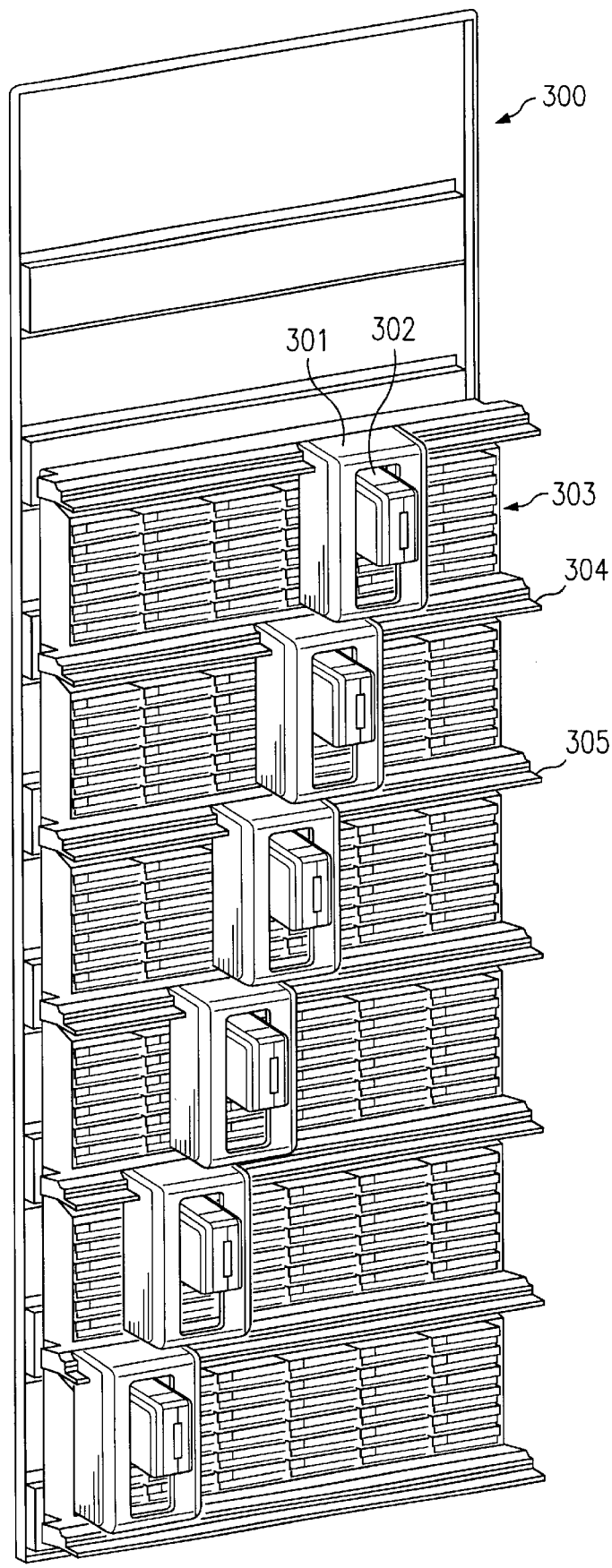
FIG. 3 depicts a pictorial diagram illustrating a library system employing short robotic vertical scaling in accordance with the present invention.

Referring now to FIG. 3, a pictorial diagram illustrating a library system employing short robotic vertical scaling is depicted in accordance with the present invention. The library system 300 depicted in FIG. 3 uses a wall type configuration. The robots, e.g., robot 301, use an elevator system similar to that illustrated in FIGS. 2A and 2B, which allows the picker mechanism 302 to travel vertically within the robot carriage. The robots 301 can also travel horizontally along guide rails, e.g., rails 304 and 305, similar to robot 102 in FIG. 1.

The storage cells 303 are arranged in rows of six and columns of seven between guide rails, all of which can been accessed by a robot 301 traveling within a given rail row. The vertical scaling in library 300 thus allows a given robot picker 302 to service 42 storage cells. By contrast, a non-scaled, single-row picker would only be able to service six storage cells.

Figure 4:
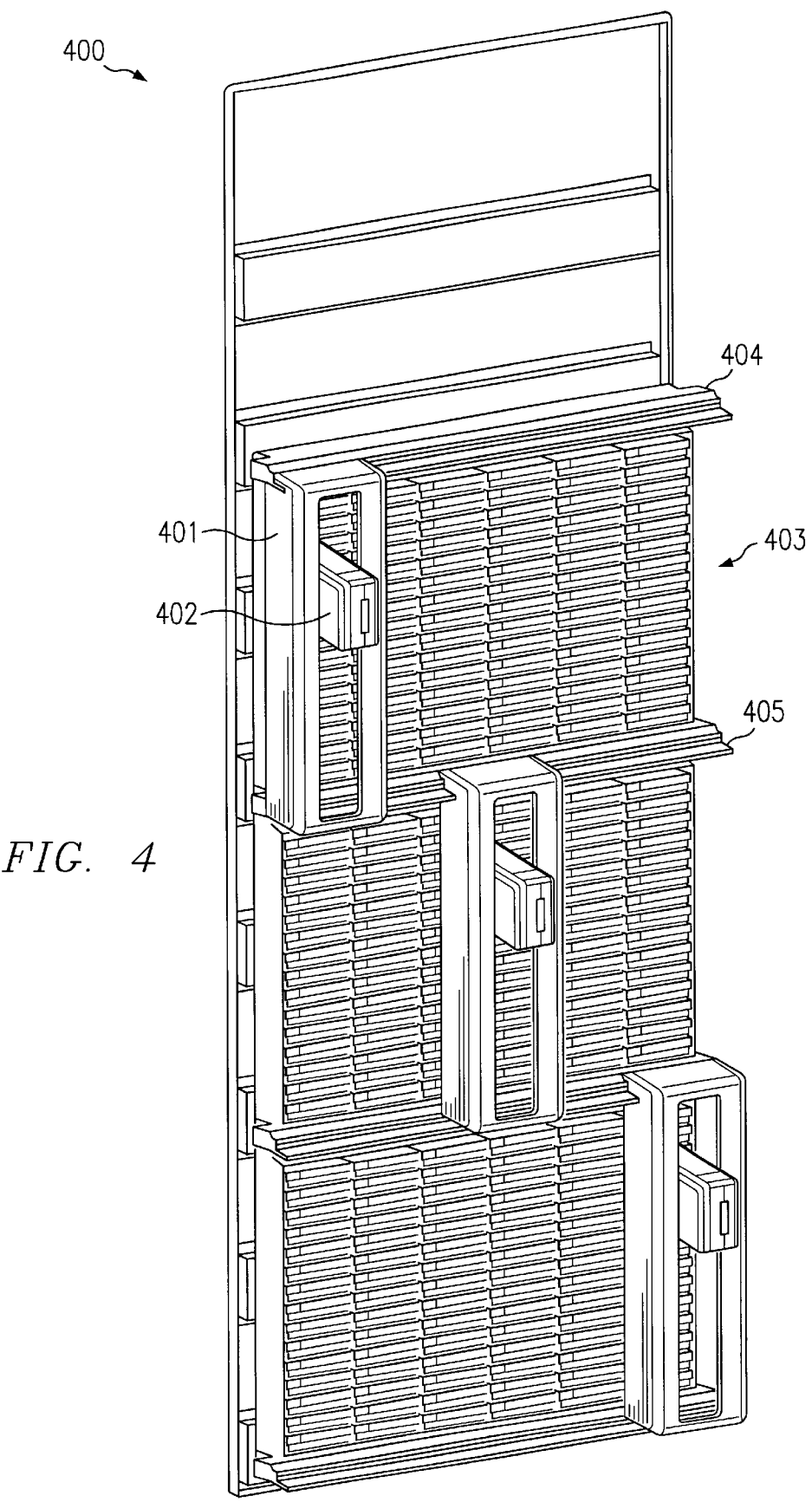
FIG. 4 depicts a pictorial diagram illustrating a library system employing long robotic vertical scaling in accordance with the present invention.

Referring to FIG. 4, a pictorial diagram illustrating a library system employing long robotic vertical scaling is depicted in accordance with the present invention. The configuration of library 400 is similar to library 300. In library 400 the storage cells 403 are arranged in rows of six and columns of 15 between guide rails, e.g., rails 404 and 405. In order to accommodate the increased number of cells 403 in each column, the elevator carriage of robot 401 is longer than the carriage of robot 301 in FIG. 3. However, picker mechanism 402 is identical to picker 302. With the increased vertical scaling of library 400, a single robot 401 can service 90 storage cells.

Library systems 300 and 400 nicely illustrate the costs and benefits described above concerning different degrees of vertical scaling. Library 300 has a performance advantage over library 400 because robot 301 is responsible for servicing less than half the number of storage cells serviced by robot 401, resulting in superior cell access speed. On the other hand, library 400 has a cost saving advantage over library 300, because library 400 requires fewer robots and guide rails. Therefore, users are able to weigh cost and performance against each other and choose a degree of vertical scaling that is optimal for the user's needs and budget. It should also be pointed out that other degrees of vertical scaling are possible beyond the examples illustrated in FIGS. 3 and 4. For example, an elevator robot unit may cover two rows of storage cells or 205 rows of cells.

Figure 5:
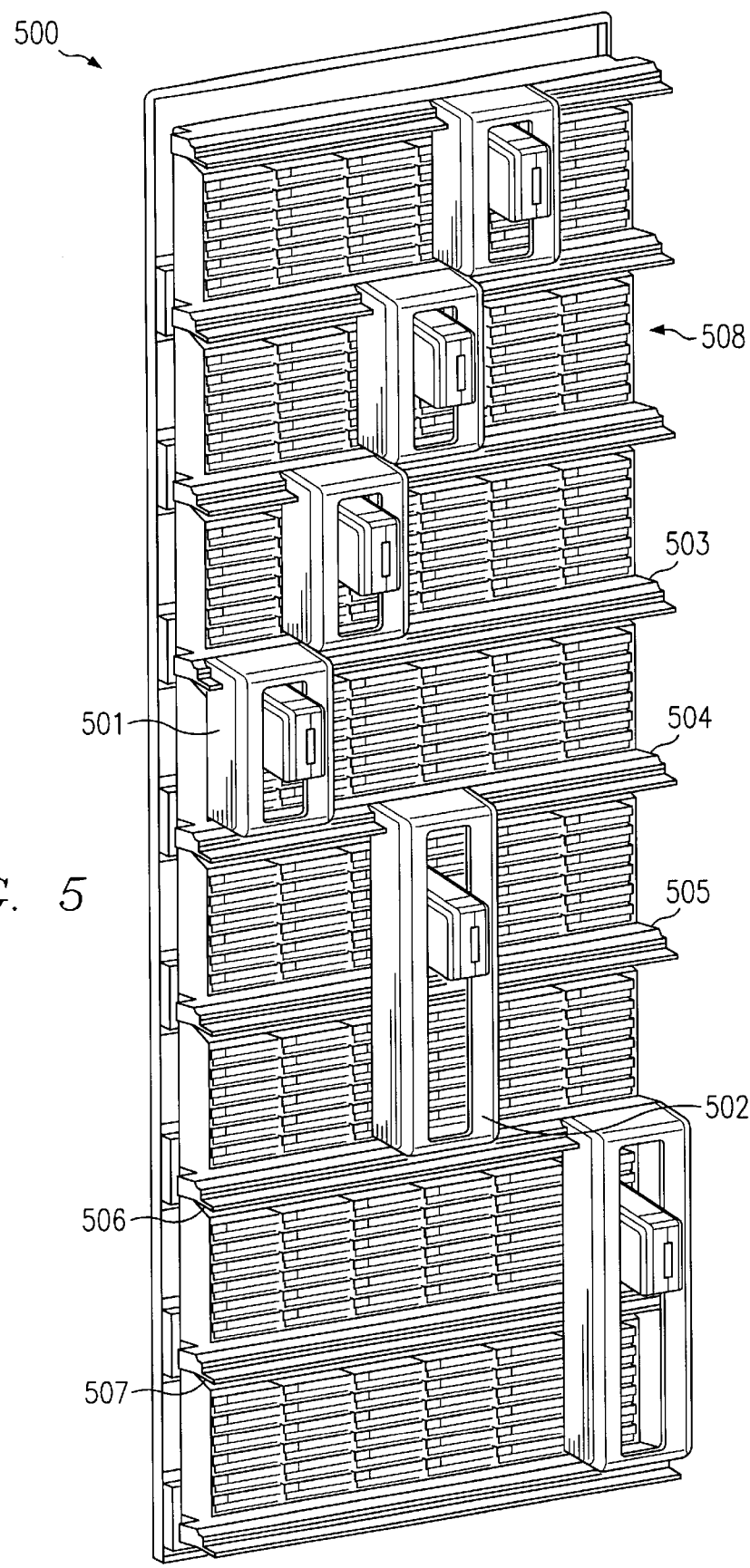
FIG. 5 depicts a pictorial diagram illustrating hybrid vertical scaling in accordance with the present invention.

Referring to FIG. 5, a pictorial diagram illustrating hybrid vertical scaling is depicted in accordance with the present invention. While FIGS. 3 and 4 illustrate different vertical scaling options, it should be pointed out that users are not limited to just one scaling option. FIG. 5 illustrates how different degrees of vertical scaling may be combined to achieve the desired balance between performance speed and cost.

The library 500 is divided into sections that are covered by smaller robots 501 and larger robots 502. In the present example, all of the storage cells 508 are divided into columns of seven between guide rails, e.g., rails 503, 504 and 505. Therefore, robot 501 is responsible for 42 storage cells, and robot 502 is responsible for 84.

Library 500 represents a variable-performance configuration, wherein robot performance is allocated according to priority. The smaller robots 501 would most likely cover storage cells which contain the most actively used media. By contrast, the larger robots 502 would cover lower priority media that are used less frequently. As user priorities and/or resources change, the vertical scaling of library 500 may be updated. For example, library 500 contains guide rail 505, which is not needed by robot 502. Robot 502 only requires guide rails 504 and 506 for support and horizontal travel. (As stated above, some elevator robots may only require one track). However, the user may decide at a later date to replace robot 502 with two smaller robots similar to robot 501. Having guide rail 505 already in place reduces the time and effort needed to upgrade the system and facilitates more dynamic reconfiguration of the library system 500 as media use priority changes. Of course, guide rails 505 and 507 may be absent if updates to the robot configuration are not necessary or anticipated. In addition, guide rails may be added or remove to accommodate robots that differ in size from robots 501 and 502.

The flexible vertical scaling method of the present invention offers users many benefits. System performance is adaptable to any desired speed by adding or subtracting robots and guide rails. System cost is also adaptable by the addition or subtraction of robots and rails. Vertical scaling also affects system reliability. Smaller robots will have fewer jobs to performs that larger robots (assuming the same number of jobs). Allocation of scarce resources is also flexible. Smaller robots can be assigned to very active media, while large robots are assigned to rarely used media.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A storage library, comprising:
   a plurality of rows of storage cells; and
   a plurality of robots coupled to guide rails, wherein the guide rails allow the robots to move along the rows of storage cells, and wherein the robots can pass each other;
   wherein the robots have picker mechanisms that can manipulate items in the storage cells, and displacement mechanisms that allow the pickers to move between rows of storage cells, and wherein the displacement mechanisms on the robots are configurable to allow the picker mechanisms to access a specified number of storage cell rows, and wherein each robot covers specified rows of storage cells exclusive of the other robots.

2. The storage library according to claim 1, wherein displacement mechanisms of different sizes can be added an removed in order to change the number of storage cell rows covered by a single robot.

3. The storage library according to claim 1, wherein the robots mount data storage cartridges from the storage cells into at least one cartridge player and dismount data storage cartridges from the cartridge player into the storage cells.

4. A storage library, comprising:
   a plurality of rows of storage cells; and
   a plurality of robots coupled to guide rails, wherein the guide rails allow the robots to move along the rows of storage cells, and wherein the robots can pass each other;
   wherein the robots have picker mechanisms that can manipulate items in the storage cells, and displacement mechanisms that allow the pickers to move between rows of storage cells, and wherein the displacement mechanisms on the robots are configurable to allow the picker mechanisms to access a specified number of storage cell rows, and wherein the displacement mechanisms are of different sizes.

5. The storage library according to claim 4, wherein displacement mechanisms of different sizes can be added and removed in order to change the number of storage cell rows covered by a single robot.

6. The storage library according to claim 4, wherein the robot mount data storage cartridges from the storage cells into at least one cartridge player and dismount data storage cartridges from the cartridge player into the storage cells.

7. A storage library, comprising:
   a plurality of rows of storage cells; and
   a plurality of robots coupled to guide rails, wherein the guide rails allow the robots to move along the rows of storage cells, and wherein the robots can pass each other;
   wherein the robots have picker mechanisms that can manipulate items in the storage cells, and displacement mechanisms that allow the pickers to move between rows of storage cells, and wherein the displacement mechanisms on the robots are configurable to allow the picker mechanisms to access a specified number of storage cell rows, and wherein guide rails can be added and removed to accommodate different numbers of robots and sizes of displacement mechanism.

8. The storage library according to claim 7, wherein displacement mechanisms of different sizes can be added and removed in order to change the number of storage cell rows covered by a single robot.

9. The storage library according to claim 7, wherein the robots mount data storage cartridges from the storage cells into at least one cartridge player and dismount data storage cartridges from the cartridge player into the storage cells.

10. A method in a storage library comprising a plurality of rows of storage cells and a plurality of robots on guide rails, wherein the robots have picker mechanisms that can manipulate items in the storage cells, and displacement mechanisms that allow the pickers to move between rows of storage cells, wherein the robots can pass each other, the method comprising:
    configuring the displacement mechanisms on the robots to allow the picker mechanisms to access a plurality of storage cell rows, wherein each robot covers specified rows of storage cells exclusive of the other robots.

11. The method according to claim 10, further comprising:
    specifying a number of storage cell rows that a given robot may access; and
    configuring the displacement mechanism on the robot to allow the picker mechanism to access the specified number of storage cell rows.

12. The method according to claim 11, further comprising:
    change the specified number of storage cell rows that a given robot may access; and
    reconfiguring the displacement mechanism on the robot to allow the picker mechanism to access the new specified number of storage cell rows.

13. The storage library according to claim 10, wherein displacement mechanisms of different sizes can be added and removed in order to change the number of storage cell rows covered by a single robot.

14. The storage library according to claim 10, wherein the robots mount data storage cartridges from the storage cells into at least one cartridge player and dismount data storage cartridges from the cartridge player into the storage cells.

15. A method in a storage library comprising a plurality of rows of storage cells and a plurality of robots on guide rails, wherein the robots have picker mechanisms that can manipulate items in the storage cells, and displacement mechanisms that allow the pickers to move between rows of storage cells, wherein the robots can pass each other, the method comprising:

configuring the displacement mechanisms on the robots to allow the picker mechanisms to access a plurality of storage cell rows, wherein the displacement mechanisms are of different sizes.

16. The storage library according to claim 15, wherein displacement mechanisms of different sizes can be added and removed in order to change the number of storage cell rows covered by a single robot.

17. The storage library according to claim 15, wherein the robots mount data storage cartridge from the storage cells into at least one cartridge player and dismount data storage cartridge from the cartridge player into the storage cells.

18. A method in a storage library comprising a plurality of rows of storage cells and a plurality of robots on guide rails, wherein the robots have picker mechanisms that can manipulate items in the storage cells, and displacement mechanisms that allow the pickers to move between rows of storage cells, wherein the robots can pass each other, the method comprising:

configuring the displacement mechanisms on the robots to allow the picker mechanisms to access a plurality of storage cell rows, further comprising adding and removing guide rails to accommodate different numbers of robots and sizes of displacement mechanism.

19. The storage library according to claim 18 wherein displacement mechanisms of different sizes can be added and removed in order to change the number of storage cell rows covered by a single robot.

20. The storage library according to claim 18, wherein the robots mount data storage cartridges from the storage cells into at least one cartridge player and dismount data storage cartridges from the cartridge player into the storage cells.

* * * * *